United States Patent
Muammar et al.

(10) Patent No.: US 7,715,650 B2
(45) Date of Patent: May 11, 2010

(54) METHOD AND APPARATUS FOR DIGITAL PROCESSING OF IMAGES

(75) Inventors: Hani K. Muammar, Green Lane (GB); Nicholas P. Murphy, London (GB)

(73) Assignee: Eastman Kodak Company, Rochester, NY (US)

( * ) Notice: Subject to any disclaimer, the term of this patent is extended or adjusted under 35 U.S.C. 154(b) by 1106 days.

(21) Appl. No.: 11/365,434

(22) Filed: Mar. 1, 2006

(65) Prior Publication Data

US 2006/0204127 A1  Sep. 14, 2006

(30) Foreign Application Priority Data

Mar. 10, 2005  (GB) ................ 0504913.5

(51) Int. Cl.
G06K 9/40 (2006.01)
H04N 9/64 (2006.01)

(52) U.S. Cl. .................. 382/275; 348/246

(58) Field of Classification Search ........... 382/149, 382/274–275, 305, 312; 358/453; 356/237.2, 356/43 S, 43; 250/310, 559.4 S, 559.4; 438/140; 359/385; 348/241, 246, 247, 252

See application file for complete search history.

(56) References Cited

U.S. PATENT DOCUMENTS

| | | | |
|---|---|---|---|
| 5,012,346 A | | 4/1991 | DeJager et al. |
| 5,761,064 A | * | 6/1998 | La et al. ............... 700/110 |
| 5,875,040 A | * | 2/1999 | Matraszek et al. ......... 358/453 |
| 6,673,657 B2 | * | 1/2004 | Pnueli et al. ............. 438/140 |
| 7,071,468 B2 | * | 7/2006 | Miyai et al. ............. 250/310 |
| 7,154,605 B2 | * | 12/2006 | Worster et al. ............ 356/435 |
| 7,220,978 B2 | * | 5/2007 | Ma et al. .............. 250/559.45 |
| 7,265,900 B2 | * | 9/2007 | Korngut et al. ............ 359/385 |
| 7,339,661 B2 | * | 3/2008 | Korngut et al. .......... 356/237.2 |

FOREIGN PATENT DOCUMENTS

EP  0 624 848 A2  11/1994

* cited by examiner

Primary Examiner—Kanji Patel
(74) Attorney, Agent, or Firm—Roland R. Schindler, II (57) ABSTRACT

A method and apparatus for processing defects in a digital image include defining a defect map, having defect and non-defect entries, as a defect bounded by an expanded defect region and an outer analysis region of a different defect map values. By choosing suitable values and performing a bitwise logical OR operation on the entries the processing of the defect map is made more efficient.

21 Claims, 5 Drawing Sheets

| G | B | G | B | G | B | G | B | G |
|---|---|---|---|---|---|---|---|---|
| R | G | R | G | R | G | R | G | R |
| G | B | G | B | G | B | G | B | G |
| R | G | R | G | R | G | R | G | R |
| G | B | G | B | G | B | G | B | G |
| R | G | R | G | R | G | R | G | R |
| G | B | G | B | G | B | G | B | G |
| R | G | R | G | R | G | R | G | R |
| G | B | G | B | G | B | G | B | G |

METHOD AND APPARATUS FOR DIGITAL PROCESSING OF IMAGES

CROSS-REFERENCE TO RELATED APPLICATIONS

This application is based on GB Application Ser. No. 0504913.5 filed Mar. 10, 2005.

FIELD OF THE INVENTION

This invention relates to a method and apparatus for processing a defect region in a digital image, and more particularly to the processing of regions around a defect for defect correction.

BACKGROUND OF THE INVENTION

Conversion of analog images into digital data has become widespread for a variety of applications, including storing, manipulating, transmitting and displaying or printing copies of the images. For example, sequences of frames from a motion picture film are often digitized, image enhancement or special effects are performed on the digitized images, and the result written onto a blank film. Also, images captured on photographic media are converted to digital data and stored for readout and display as an image and/or for printing with various types of printer. In order to capture the photographic image digitally, the film frame is scanned with a light beam, and the light transmitted through the film is detected, typically as three primary colour red, green, blue (RGB) light intensity signals, and digitized. The digitized values may be formatted to a standard for video display and stored on compact disc, solid state or magnetic media. Such film digitizers take a variety of forms and the various common aspects of film digitizing, particularly line illumination and linear CCD-based digitizers, are described in greater detail in commonly assigned U.S. Pat. No. 5,012,346, incorporated herein by reference. Photographic prints can also be digitized using reflection scanners.

Part of the image can be damaged by scratches or degraded by dust. Providing replacement pixel values for corrupted, damaged or otherwise defective pixels is a common operation in digital image processing. New pixel values must be supplied more or less consistent with the image content surrounding the area of the actual defective pixels to be replaced. Another example of an image processing operation requiring pixel replacement is removal of an object from the image, for example microphone, rig and wire removal in motion pictures. Thus, 'defect' as used herein includes unwanted pixel values as well as corrupted, damaged or absent ones.

Jia and Tang, "Image Repairing: Robust Image Synthesis by Adoptive ND Tensor Voting", Proceedings IEEE CVPR, 2003 propose a defect correction algorithm which samples replacements for a defect pixel from the remaining image. It is desirable to provide defect correction having reduced computation requirements, while making use of colour information.

SUMMARY OF THE INVENTION

Embodiments of the invention provide a method and apparatus for processing a defect map of a digital image, or a selected part of an image, whereby the defects are bounded by an analysis region from which the information for processing and correcting the defect can be derived. The processing of the defect map includes performing an operation on pixels in the neighbourhood of a defect such that the processed pixels are rendered into a stable state in an efficient manner.

According to one particular embodiment of the invention there is provided a method of processing a defect map of a digital image for defect correction, which maps associated pixels of the digital image with corresponding locations on the map, defect entries at locations on the map being indicative of defective pixels in the mage and having a defect value, and other non-defect entries at locations on the map being indicative of non-defective pixels in the image and having another value, the method comprising:

a) identifying at least one defect entry which is adjacent at least one non-defect entry;

b) performing a first operation on said at least one non-defect entry to make the entry an expanded defect entry having an expanded defect value;

c) performing a second operation on an entry adjacent at least one of the expanded defect entries to make the said entry an analysis entry having an analysis value if it is a non-defect entry, any defect value or expanded defect value being unchanged by the second operation; and d) repeating steps a) to c) to define i) a region of at least one of the defect values; ii) an expanded defect region of expanded defect values around the defect region; and iii) an analysis region of analysis values around the expanded defect region.

The processing preferably includes a logic operation on binary digital data such as a logic OR operation. By assigning defect map values to the constituent entries in the defect map for defect pixels, and applying chosen values for expanded defect entries and analysis entries, the processing can be conducted in a way that stabilises the expanded defect pixels into an unchangeable value in a first operation and, thereafter, only modifies analysis entry values according to their proximity to expanded defect entries and the processing of the defect and expanded defect entries. Preferable values based on a logic OR operation are 255 for the defect value, 254 for the expanded defect value, 126 for the analysis value and O for the non-defect value.

In a particular form of this embodiment of the invention the processing is conducted from a defect entry in a defect map along rows and/or columns in, for example a bitwise logical operation.

Embodiments of the invention also include storage media loaded with a program for executing the method and a computer system constructed and arranged to perform the method.

In a particular form, the invention is embodied as part of a method and apparatus for correcting a defect in a digital image. For example, this may include identifying a defect in the image itself from which identification the defect map is then derived.

In an alternative form, embodiments of the invention include a method and apparatus for determining the similarity between a defect pixel in a particular position and a candidate pixel in another position of a colour digital image.

In embodiments of this aspect of invention the M colour channels of N available colour channels for the pixels are selected. The values of the channels for the candidate and other pixels are compared. It is found that a suitable comparison can be made by selecting and comparing a subset of the available channels, thereby making the process more efficient. The favoured channel is that which is most perceptible to the human eye. This is typically the green channel in a RGB system, but it need not include the green channel.

In one preferable embodiment, the M colour channels are selected according to a predetermined pattern. For example, a Bayer pattern can be used of alternating colour channels.

In one embodiment, the method particularly lends itself to implementation on a computer, preferably a programmable digital computer. The necessary calculations described below can be performed by the computer's processor, while anything requiring storage can be stored in a storage device (e.g. RAM or disk) in the computer.

Embodiments of the present disclosure then provide a method and apparatus for providing substitute pixel values for pixels in a defect region of an image signal.

BRIEF DESCRIPTION OF THE DRAWINGS

FIG. 2b is a pictorial view of a defect map for the digital image in FIG. 2a;

FIG. 2c is a pictorial view of a corrected digital image after correction of the defect pixels in the digital image in FIG. 2a;

DISCLOSED EMBODIMENTS

Figure 1:
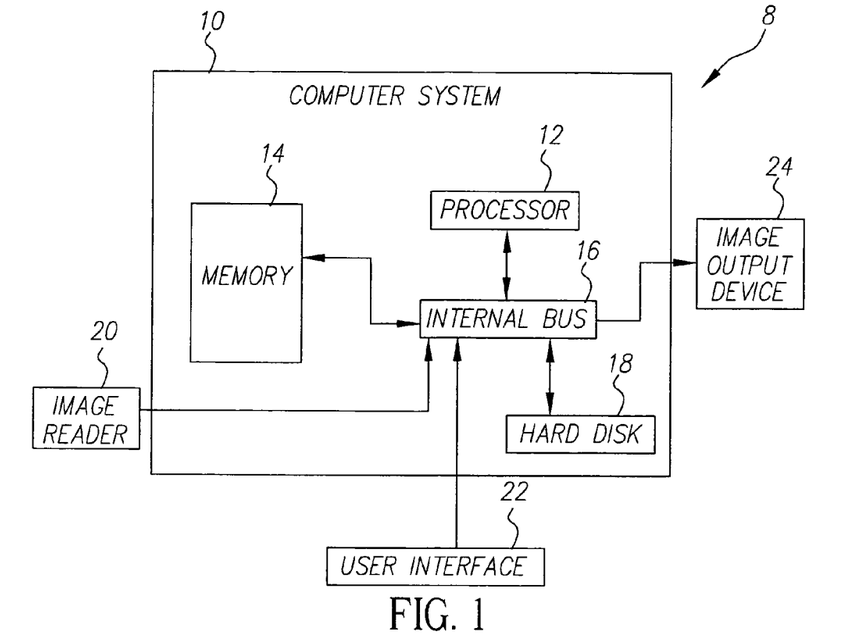
FIG. 1 is a block diagram of an apparatus of an embodiment of the present invention.

Referring to FIG. 1, an apparatus 8 in accordance with an embodiment of the present invention includes a programmed digital computer system 10 coupled to an image reader 20, an image output device 24, and a user interface 22. Computer system 10 operates according to a set of instructions to correct digital images by providing new values for defect pixels within a defect region in the digital image. With the apparatus and method, defect regions in digital images can be corrected so that the defect is substantially unnoticeable to a viewer, or at least visually less discernible, because values for defect pixels have been replaced with values which are consistent with the overall image in the region surrounding the defect.

Computer system 10 includes a processor 12, a memory 14 and a hard disk 18, which are coupled together with an internal bus 16 for communicating both data and addresses between these components. Preferably, digital images are stored on hard disk 18 in system 10. The memory 14 is used to store the programs by which the described methods are executed.

Image reader 20 is coupled to computer system 10, and provides a digital image to the computer system 10 via the internal bus 16. This digital image is also stored in the memory 14. In this particular embodiment, image reader 20 is a digital scanner, such as Kodak Professional Photo-CD 4045 Film Scanner, incorporated herein by reference, or a digital camera. Any other type of device for providing a digital image may be used. The digital image captured by reader 20 is the digital representation of any hard copy image such as frames of a motion picture film or a still picture. Computer system 10 may also receive digital images from other sources, such as digital images stored in hard disk 18. Each digital image is composed of an array of pixels, each pixel having one or more color channels. In this embodiment, each pixel comprises conventional RGB channels.

Image output device 24 is coupled to computer system 10. In this particular embodiment, output device 24 may be any type of digital image output device, such as a video display, a printer, an external non-volatile memory storage device, or a transmission line to other computers within a network. Images stored in memory 14 may be output to image output device 24 through internal bus 16. In the case of source images representing frames from a motion picture, the images following correction by the present apparatus and method can, for example, be printed onto a film.

User interface 22, such as a keyboard or mouse device, is coupled to computer system 10 and allows for a user to control and interact with apparatus 8. User inputs through user interface 22 are described later.

Figure 2A:
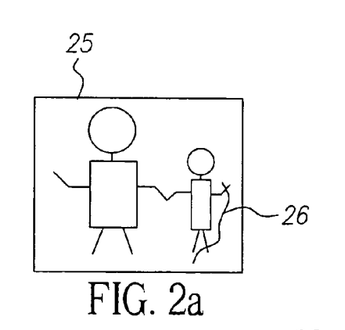
FIG. 2a is a pictorial view of a digital image with a defect pixel region.
Figure 2B:
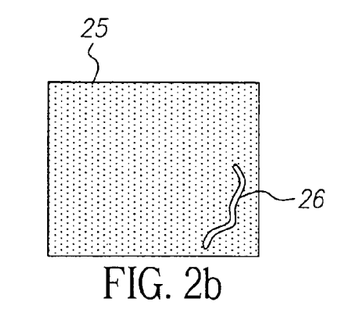
Figure 2C:
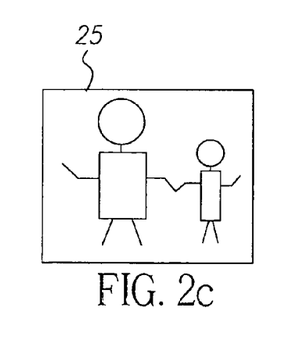

Referring to FIGS. 2a-2c, the operation of apparatus 8 will be discussed. When computer system 10 is started, it receives a digital image from image reader 20 or elsewhere and stores the image in memory 14. Alternatively, the digital image can be transferred from hard disk 18 to memory 14. The image stored in memory 14 will hereinafter be referred to as the "source image." An example of the source image 25 is shown in FIG. 2a with defect region 26.

Once the source image is stored in memory 14, the defect regions in the source image are located. Preferably, this is performed by the user identifying the approximate image areas containing the defect regions through user interface 22. Processor 12 then automatically detects the defect pixels in those areas identified by the user. One system for identifying defect pixels is the system disclosed in EP 0 624 848 A, incorporated herein by reference. Briefly, this defect pixel identification system automatically identifies small local regions of an image which are anomalous in brightness, colour, local contrast and size. The system outputs a map of the defect pixels in the image. Alternatively, the defect pixels themselves may be selected manually by the user. This selection can be performed by the user generating a digital mask via user interface 22 (for example, by a graphic "painting" software application) identifying the defect pixels. As mentioned previously, by 'defect' is meant not only faults in the digitization of the image, but also other identifiable phenomena in an image that it has been decided to eliminate. For example, the user can choose to nominate a 'defect' which is actually a true representation of the scene, but which is required to be removed. Once the defect regions are located, a defect map is built and stored in memory 14. In the defect map, entries with a specified value correspond to defect pixel locations in the source image. One example of a defect map is shown in FIG. 2b for the defect region 26 of the source image 25 in FIG. 2a. In this example, defect pixel entries are assigned a value of 255, and non-defect pixels are assigned a value of 0.

Figure 3:
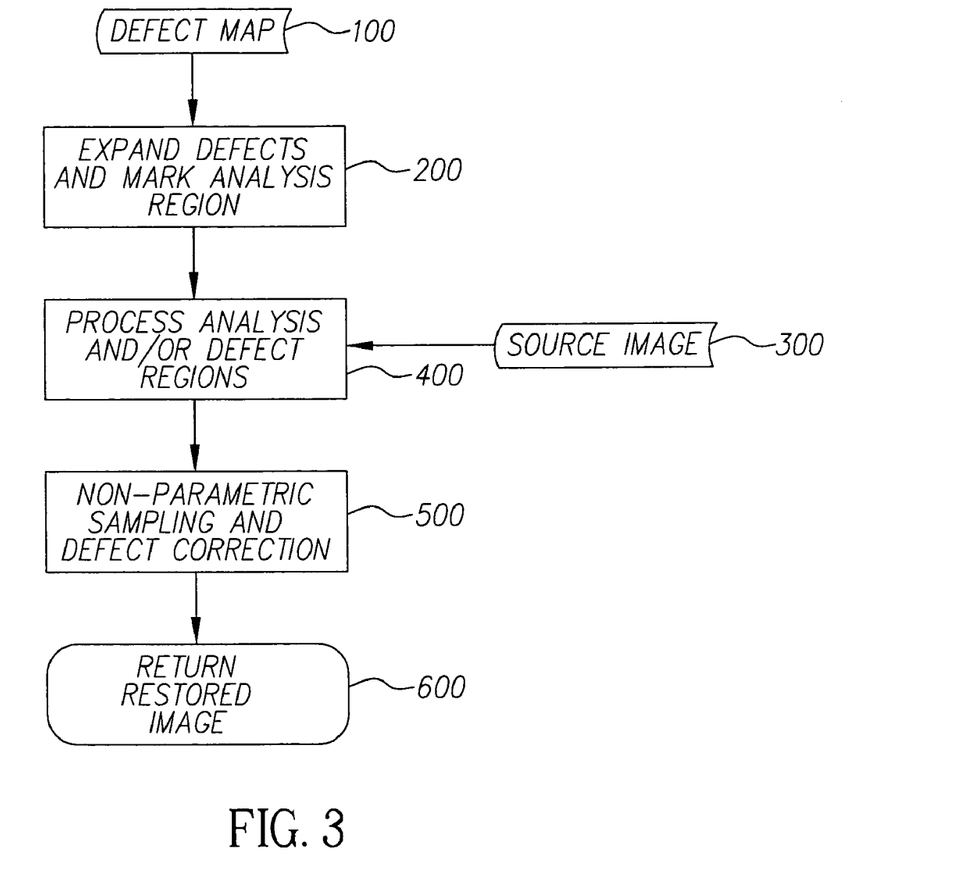
FIG. 3 is a flow diagram of a defect correction algorithm using defect expansion.

An embodiment of the invention, as implemented on the apparatus of FIG. 1, is now described in summary form with reference to FIG. 3 which depicts a flow diagram giving an overview of a defect correction algorithm used in this embodiment. The algorithm takes as an input defect map 100, as derived above, and expands any defects in the defect map at step 200. Step 200 adds an analysis region to each defect as described in more detail below.

Figure 4:
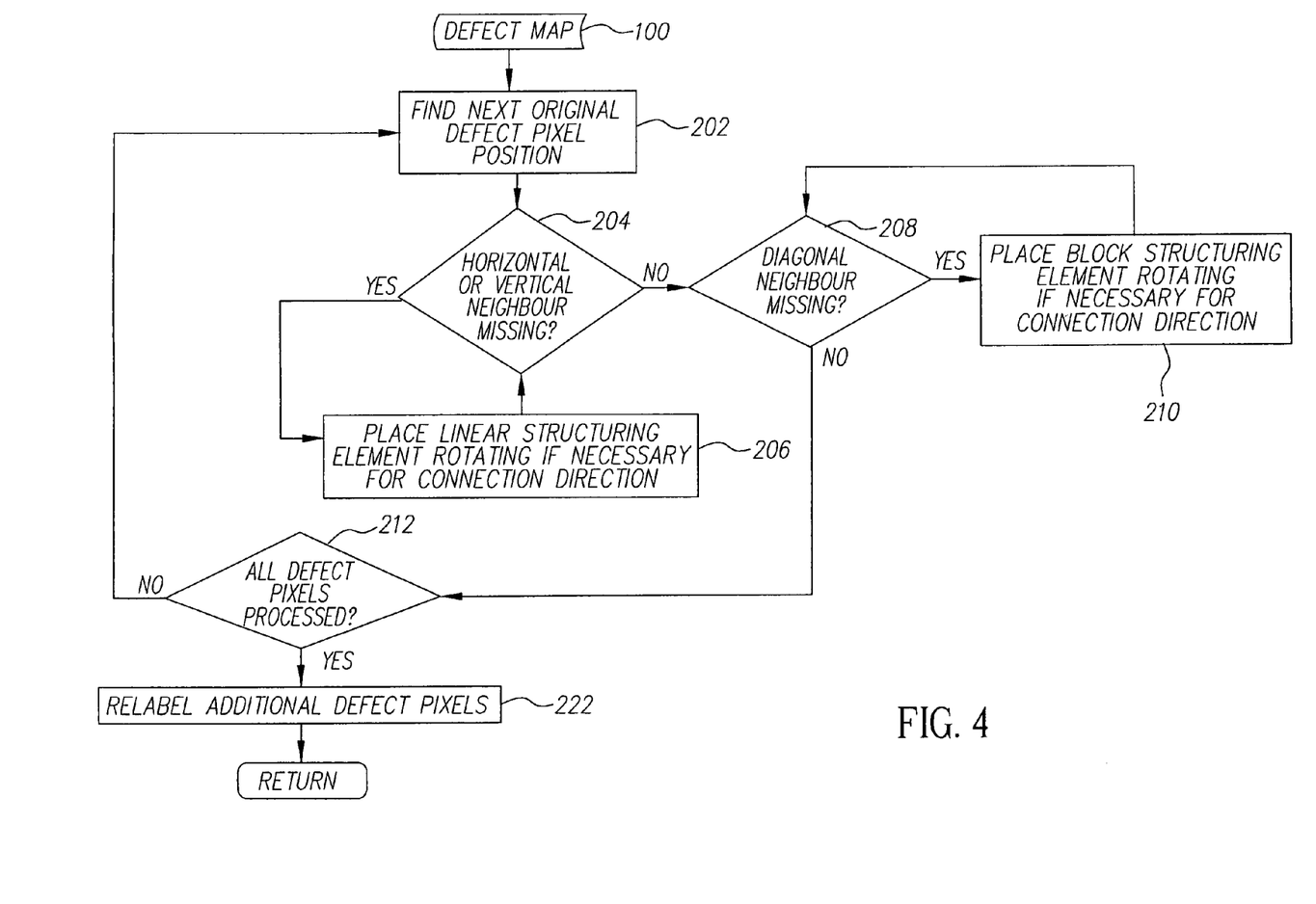
FIG. 4 is a flow diagram of defect expansion and marking of an analysis region.

Initial processing of the defect map at step 200 is now described with reference to FIGS. 4 and 5. At step 202 an original defect pixel position is found by looking for a defect pixel entry in the defect map having a value of 255, i.e.

corresponding to an identified original defect in the image. Step 204 tests whether any of the horizontal or vertical neighbours of the defect pixel position in question are not also part of the defect, that is having a value of 0 in the defect map. For a defect having only a vertical or horizontal aspect adjacent a non-defect entry a linear structuring element is placed at the defect entry location at step 206 with a value of 255, as described in more detail below. For a defect entry having both a vertical and a horizontal aspect adjacent non-defect entries or a diagonally adjacent non-defect entry, step 210 places a block structuring element, again described in more detail below, at the defect entry location in question. Once no more 255 value neighbours are found and the region around the original defect pixel in question has thus been processed and defined step 212 tests if all defect entries have been processed and loops back to step 202 to find the next original defect pixel entry. The procedure is repeated for the new corresponding defect pixel entry location in the defect map. The algorithm iterates until all defect pixel entries have been processed.

Figure 5:
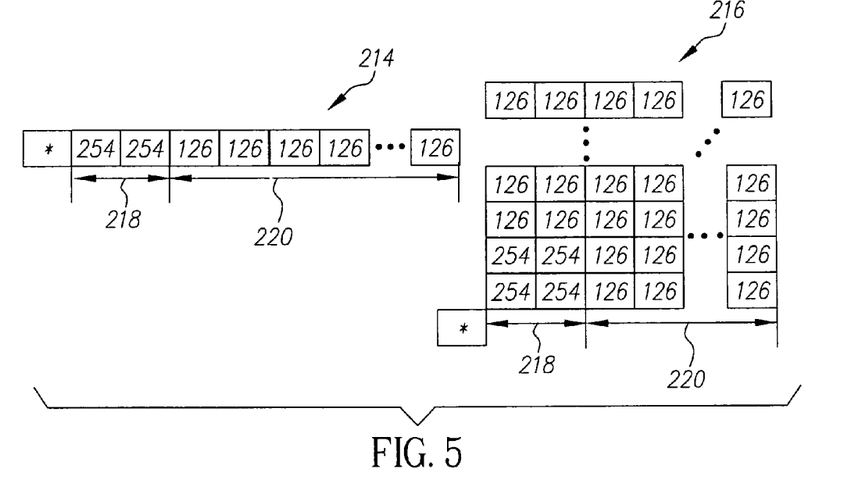
FIG. 5 is an illustration of structuring elements used in the algorithm of FIG. 4.

FIG. 5 schematically shows a linear structuring element (SE) 214 and a block structuring element 216 used in the processing of the defect entries, as described above. The linear structuring element 214 comprises one or more defect expansion operators marked with the numerical value 254 (original defect pixels being labelled 255) adjacent the original defect pixel operator (marked by an * in the figure) and followed by one or more analysis pixel entry operators marked with the numerical value 126. If the original defect entry is missing a horizontal defect entry neighbour to the right, the linear row structuring element shown in the figure is placed adjacent it. Otherwise the element is rotated by appropriate multiples of 90° before placing it next to the defect entry.

The diagonal structuring element 216 is used when an original pixel is missing a diagonal defect entry neighbour, with appropriate rotations through multiples of 90° according to the orientation of the defect entry and its neighbour. In a specific implementation of the embodiment, the defect expansion size 218 indicated in FIG. 5 is 2 and the analysis expansion 220 size is 20.

The structuring elements are placed in the map by applying a bitwise logical OR operation with any overlapping entries of the defect map. Together with a numerical value of 255 for original defect entries in the map and of zero for non-defect entries, the method uses the numerical values of 254 for the defect expansion entries and 126 for the analysis expansion entries such that when the bitwise OR operation is applied to the entries on the map existing defect locations are not overwritten to become analysis locations but existing analysis locations can be transformed into expanded defect locations. Thus, the defect and expanded defect entries are stable entries for any subsequent application of the bitwise logical operations. The truth table in Table 1 illustrates this when considering the binary representation of the structuring element values.

TABLE 1

| Existing map value (A) | Coincident SE value (B) | Result A|B |
| --- | --- | --- |
| 255 ($11111111_2$) | 254 ($11111110_2$) | 255 ($11111111_2$) |
| 254 ($11111110_2$) | 254 ($11111110_2$) | 254 ($11111110_2$) |
| 126 ($01111110_2$) | 254 ($11111110_2$) | 254 ($11111110_2$) |
| 255 ($11111111_2$) | 126 ($01111110_2$) | 255 ($11111111_2$) |
| 254 ($11111110_2$) | 126 ($01111110_2$) | 254 ($11111110_2$) |
| 126 ($01111110_2$) | 126 ($01111110_2$) | 126 ($01111110_2$) |

Once the loop of step 212 is completed, all newly placed, defect expansion locations with the label of 254 are re-labelled 255 such that all effective defect entries are labelled 255 in the processed defect map. For example, the value 127 ($01111112_2$) could be applied to the whole map using the OR operator—this would result in all defect entries being labelled 255 and all analysis locations being labelled 127. The defect expansion algorithm then returns to the main algorithm.

Following defect expansion, the algorithm takes source image 300 as an input and at step 400 performs some further processing of the source image within the analysis regions defined at step 200. For example in, step 400 colour segmentation may be applied to each analysis region. This partitions each analysis region into patches or segments of similar colour. If the analysis region is segmented, this can then be used to segment the defect itself by matching and connecting analysis region segments across the defect. Pairs of segments which are connected in this way by a segment of the defect then each define a closed region within the analysis region and a code book of image snippets or neighbourhoods is defined for each such region. The code book of each region may then be used to perform non-parametric sampling restoration for the corresponding defect segment within each respective region at step 500 (described in more detail below).

If the analysis region is not segmented, the codebook would be defined in the whole analysis region and sampling would be performed for all of the defect entries from all of the analysis region.

Performing the pixel sampling restoration, a test neighbourhood is formed by capturing the pixels in the neighbourhood centred on a defect pixel to be replaced, for example a neighbourhood of 9×9 pixels. A test vector is formed by concatenating those pixels of the test neighbourhood which lie within the analysis region by rows or columns, and indexing the position of each pixel within the 9×9 neighbourhood. A codebook is formed by calculating the test vectors corresponding to all test neighbourhoods within the analysis region (or the segment of the analysis region associated with the defect pixel in question). The test vector of the defected pixel is then compared to all test vectors of the code book and the defect pixel is replaced with the pixel of the analysis region whose corresponding test vector is most similar to the test vector of the defect pixels.

Figure 6:
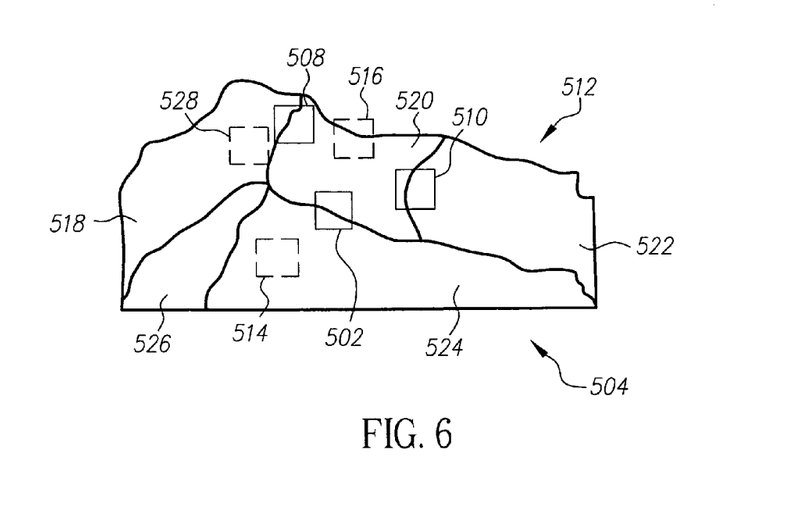
FIG. 6 is an illustration of test neighbourhoods.

FIG. 6 illustrates the creation of a codebook for a test neighbourhood 502 associated with a defect pixel of defect 504. Test vectors 508 and 510 are within the analysis region 512 and are therefore valid test vectors for comparison with test vector 502. Test vector 514 is within the defect itself and is therefore not a valid test vector. Test neighbourhood 514 is not within the analysis region and is also not a valid test vector. In the example shown in FIG. 6, the analysis region has been segmented into segments 518, 520 and 522. Defect segment 524 is associated with analysis segments 520 and 522 and defect segment 526 is associated with analysis segment 518. Given that the test neighbourhood 502 is associated with a defect region 524, the test neighbourhood 528 which is within segment 518 of the analysis region is not a valid test neighbourhood and hence not included in the codebook for the defect pixel in question.

In order to form the test vectors constituting the code books from the test neighbourhood a numerical value has to be extracted from each pixel. As discussed above, prior art approaches have used the luminance value of the pixel (averaging the red, green and blue channels of the pixel) for this purpose. However, this discards any colour information from the image and requires further calculations on each pixel to determine the luminance value. In embodiments of the present invention, the test vector is found by selecting one or more colour channels for each pixel and forming a test vector from the corresponding colour values. Importantly, the method uses less than all of the available colour channels (one or two in the case of an RGB image) and thus retains some degree of colour information while reducing the amount of computation required for comparing the test vectors as compared to a method using the full colour information.

In a particular implementation, only one colour channel is selected for each pixel, representing the maximum computational saving. In order to increase the perceptual relevance of the measure of similarity used to compare the test vectors, it is possible to select the colour channel which is of highest perceptual relevance for more pixels than the remaining colour channels.

In the example of an RGB image, the green colour channel tends to be most representative of the luminance signal and also has the highest perceptual relevance. Accordingly, a method of calculating a measure of similarity between test vectors could over represent the green channel by selecting the green channel for more pixels then the remaining red and blue channels.

Figure 7:
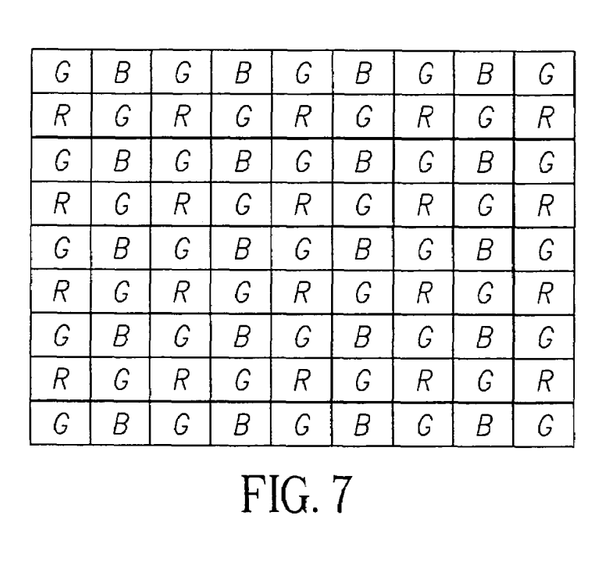
FIG. 7 depicts a Bayer pattern used for calculating the measure of similarity for sampling.

In one particular implementation of this idea, the colour channels of the pixels for the test neighbourhoods are selected according to a Bayer pattern, as shown in FIG. 7, in order to form the test vector. This means that in one row of this test neighbourhood the green and blue colour channels are selected for alternating pixels and in the two adjacent rows the green and the red channels are selected for alternating pixels. This pattern is repeated until all of the test neighbourhoods have been covered. The nature of the Bayer pattern is such that the same alternation holds when considering columns instead of rows.

If the pixels are of sufficient resolution, applying the Bayer pattern to the image would, in fact, not perceptually alter the first of the images significantly. Thus, from a perceptual perspective the colour information relevant for the selection of test vectors is conserved as compared to a method which uses only grey-scales. At the same time, some additional computational savings are achieved by not having to calculate the grey-scale value for each pixel.

It is understood that the above method is applicable to any method of calculating a measure of similarity between two neighbourhoods in a digital image regardless of the actual use to which it is put. For example, the measure may be calculated as the sum of the squared differences of corresponding colour values.

Furthermore, the measure of similarity can be computed using any suitable computation.

It will be understood that, while the steps of FIG. 3 are described as being carried out on all defects before moving on to the next step, an alternative implementation first carries out processing on one defect and each defect is processed in turn. In fact, steps 200 and 400 maybe intermingled in any suitable order or combination.

Figure 8:
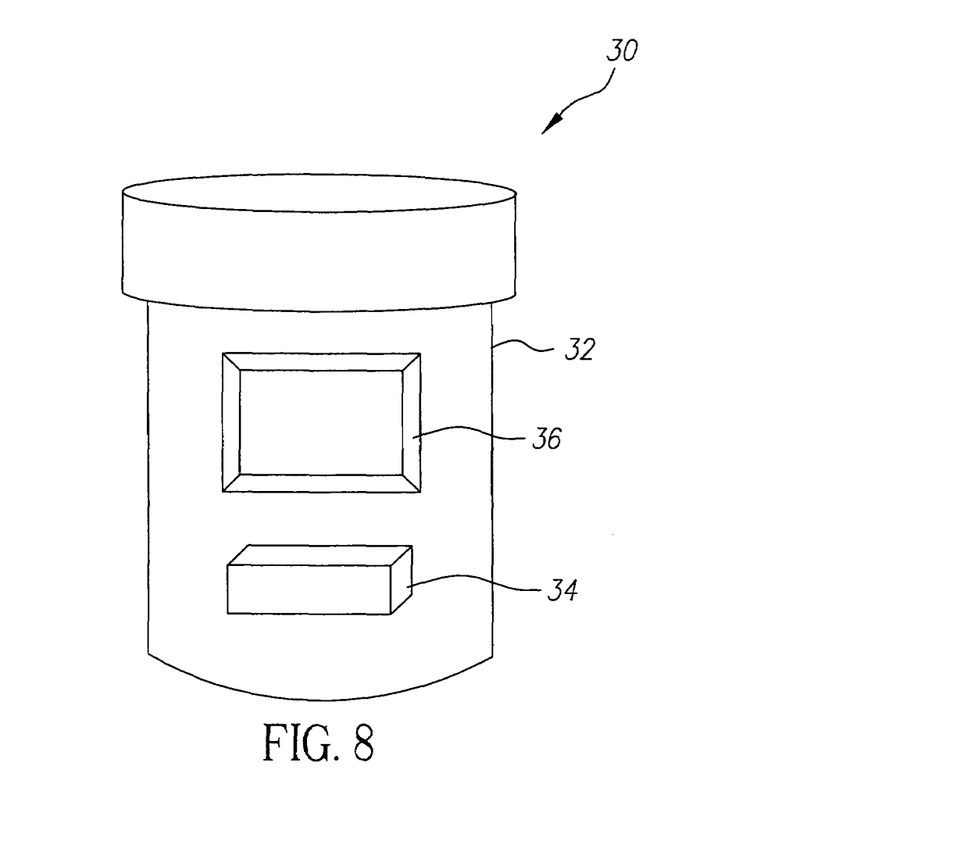
FIG. 8 is a schematic depiction of an image processing kiosk.

One particular use of the method as described above is in relation to an image processing service using a processing kiosk 30 now described with reference to FIG. 8. The kiosk comprises a body structure 32, input terminal 34 and display 36. Such a kiosk may be provided for example in a drug store and a user can use the kiosk to scan in prints of photographs or other documents or to load up pictures from a digital storage medium. The corresponding images then are processed using the methods described above and the processed image can be printed for the customer using a printer device located within the kiosk.

PARTS LIST 8 apparatus
10 computer system
12 processor
14 memory
16 internal bus
18 hard disk
20 image reader
22 user interface
24 image output device
25 source image
26 defect region
30 processing kiosk
32 body structure
34 input terminal
36 display
100 defect map
126 numerical value
200 expand defects and mark analysis region step
202 find next original defect pixel position step
204 horizontal or vertical neighbour missing step
206 place linear structuring element rotating if necessary for connection direction step
208 diagonal neighbour missing step
210 place block structuring element rotating if necessary for connection direction step
212 all defect pixels processed step
214 linear structuring element
216 block structuring element
218 defect expansion size
220 analysis expansion
222 relabel additional defect pixels step
254 numerical value
300 source image
400 process analysis and/or defect regions step
500 non-parametric sampling and defect correction step
502 test neighbourhood
504 defect pixel of defect
508 test vector
510 test vector
512 analysis region
514 test vector
518 analysis segment
520 analysis segment
522 analysis segment
524 defect segment
526 defect segment
528 test neighbourhood
600 return restored image step

The invention claimed is:

1. A method of processing a defect map of a digital image for defect correction, which map associates pixels of the digital image with corresponding locations on the map, defect entries at locations on the map being indicative of defective pixels in the image and having a defect value, and other non-defect entries at locations on the map being indicative of non-defective pixels in the image and having another value, the method being implemented at least in part using a processor and comprising:

a) identifying at least one defect entry which is adjacent at least one non-defect entry;
b) performing a first operation on said at least one non-defect entry to make the entry an expanded defect entry having an expanded defect value;
c) performing a second operation on an entry adjacent at least one of the expanded defect entries to make the said entry an analysis entry having an analysis value if it is a non-defect entry, any defect value or expanded defect value being unchanged by the second operation; and d) repeating steps a) to c) to define i) a defect region of at least one of the defect values; ii) an expanded defect region of expanded defect values around the defect region; and iii) an analysis region of analysis values around the expanded defect region.

2. A method as claimed in claim 1, in which the first and second operations include a logical OR operation.

3. A method as claimed in claim 2, in which the defect value, the expanded defect value, the analysis value and the non-defect value is 0.

4. A method as claimed in claim 2, in which the first and second operations are performed consecutively on adjacent entries in a bitwise logical operation.

5. A method as claimed in claim 4, in which the bitwise logical operation includes row and column operators for a defect entry bounded on three sides by defect entries.

6. A method as chimed in claim 4, in which the bitwise logical operation includes a two-dimensional array of operators for defect entries bounded on one or two sides by defect entries.

7. A method as claimed in claim 6, in which the two-dimensional array comprises rows and columns of operators.

8. A method as claimed in claim 4, in which the rows and columns of operators comprise, a first group of expanded defect operators and a second adjacent group of analysis operators.

9. A method of correcting a defect in a digital image comprising performing the method of claim 1 to process the defect and correcting the defect according to the values of the entries in the analysis region.

10. Apparatus for processing a defect map of a digital image for defect correction, which map associated pixels of the digital image with corresponding locations on the map, defect entries at locations on the map being indicative of defective pixels on the image and having a defect value, and other non-defect entries at locations on the map being indicative of non-defective pixels in the image and having another value, the system comprising:

a) means for identifying at least one defect entry which is adjacent at least non-defect entry;

b) means for performing a first operation on said at least one non-defect entry to make the entry an expanded defect entry having an expanded defect value;

c) means for performing a second operation on an entry adjacent at least one of the expanded defect entries to make the said entry an analysis entry having an analysis value if it is a non-defect entry, any defect value or the expanded defect valued being unchangeable by the second operation; and d) means for repeating steps a) to c) to define i) a defect region of at least one of the defect entries; ii) an expanded defect region of expanded defect entries around the defect region, and iii) an analysis region of analysis entries around the expanded defect region.

11. Apparatus as claimed in claim 10, in which the means for performing the first and second operations include means for performing a logical OR operation.

12. Apparatus as claimed in claim 11, in which the defect value is 255, the expanded value is 254, the analysis region value is 126 and the non-defect value is 0.

13. Apparatus as claimed in claim 11, in which the means for performing the first and second operations are operable to perform a bitwise logical operation.

14. Apparatus as claimed in claim 13, in which the means for performing the first and second operations include row and column operators for a defect entry bounded on three sides by defect entries.

15. Apparatus as claimed in claim 13, in which the means for performing the first and second operations include a two-dimensional array of operators for defect entries bounded on one or two sides by defect entries.

16. Apparatus as claimed in claim 15, in which the two dimensional array comprises row and columns of operators.

17. Apparatus as claimed in claim 13, in which the rows and columns of operators comprise a first group of expanded defect operators and a second group of analysis operators.

18. Defect correction apparatus for correcting a defect in a digital image comprising apparatus as claimed in claim 10 and means for correcting the defect according to the values of the entries in the analysis region.

19. Apparatus as claimed in claim 18, including means for identifying a defect in a digital image, and means for entering the identified defect in the defect map as a defect value.

20. A computer system including processor and being constructed and arranged to perform the method of claim 1.

21. A computer storage medium on which is stored a computer program which when loaded on a computer is executable to perform the method of claim 1.

\* \* \* \* \*

UNITED STATES PATENT AND TRADEMARK OFFICE
CERTIFICATE OF CORRECTION

PATENT NO. : 7,715,650 B2  Page 1 of 1
APPLICATION NO. : 11/365434
DATED : May 11, 2010
INVENTOR(S) : Mani K. Mauammar It is certified that error appears in the above-identified patent and that said Letters Patent is hereby corrected as shown below:

| Issued Patent | | Description of Error |
|---|---|---|
| Column | Line | |
| 9 | 20 | In Claim 6, delete "chimed" and insert --claimed-- |

Signed and Sealed this

Twelfth Day of October, 2010

David J. Kappos
*Director of the United States Patent and Trademark Office*